United States Patent
Breitgand et al.

(10) Patent No.: US 9,858,095 B2
(45) Date of Patent: Jan. 2, 2018

(54) DYNAMIC VIRTUAL MACHINE RESIZING IN A CLOUD COMPUTING INFRASTRUCTURE

(71) Applicants: David Breitgand, Modiin (IL); Dilma M. Da Silva, Mountain View, CA (US); Amir Epstein, Herzelia (IL); Alexander Glikson, Haifa (IL); Michael R. Hines, Ossining, NY (US); Kyung D. Ryu, New City, NY (US); Marcio A. Silva, Mahopac, NY (US)

(72) Inventors: David Breitgand, Modiin (IL); Dilma M. Da Silva, Mountain View, CA (US); Amir Epstein, Herzelia (IL); Alexander Glikson, Haifa (IL); Michael R. Hines, Ossining, NY (US); Kyung D. Ryu, New City, NY (US); Marcio A. Silva, Mahopac, NY (US)

(73) Assignee: International Business Machines Corporation, Armonk, NY (US)

( * ) Notice: Subject to any disclaimer, the term of this patent is extended or adjusted under 35 U.S.C. 154(b) by 315 days.

(21) Appl. No.: 13/621,526

(22) Filed: Sep. 17, 2012

(65) Prior Publication Data

US 2014/0082612 A1    Mar. 20, 2014

(51) Int. Cl.
*G06F 9/455* (2006.01)
*G06F 9/50* (2006.01)

(52) U.S. Cl.
CPC ........ *G06F 9/45533* (2013.01); *G06F 9/5005* (2013.01); *G06F 9/5077* (2013.01);
(Continued)

(58) Field of Classification Search
None
See application file for complete search history.

(56) References Cited

U.S. PATENT DOCUMENTS

| 2005/0021788 A1* | 1/2005 | Tucker | G06F 21/6281 |
| | | | 709/229 |
| 2005/0120160 A1* | 6/2005 | Plouffe | G06F 9/45537 |
| | | | 711/1 |

(Continued)

FOREIGN PATENT DOCUMENTS

WO    2011159842 A2    12/2011

OTHER PUBLICATIONS

Khalid et al., "Dynamic Scheduling of Virtual Machines Running HPC Workloads in Scientific Grids," International Conference on new Technologies, mobility and Security, 9NTMS, 2009.

(Continued)

*Primary Examiner* — Lewis A Bullock, Jr
*Assistant Examiner* — Bruce S Ashley
(74) *Attorney, Agent, or Firm* — Daniel P. Morris, Esq.; Otterstedt, Ellenbogen & Kammer, LLP (57) ABSTRACT

A method for providing dynamic resizing of at least one virtual machine in a cloud infrastructure includes steps of: obtaining a measure of resource usage for the virtual machine and/or application performance of an application running on the virtual machine; determining, as a function of prescribed rules relating to resource usage and the measure of resource usage and/or application performance, whether the virtual machine requires resizing; and resizing the virtual machine to dynamically change resource availability for the virtual machine so as to maintain resource usage and/or application performance within prescribed limits defined by the prescribed rules.

20 Claims, 5 Drawing Sheets

(52) U.S. Cl.
CPC .. *G06F 2209/501* (2013.01); *G06F 2209/504* (2013.01); *Y02B 60/142* (2013.01)

(56) References Cited

U.S. PATENT DOCUMENTS

| | | | |
|---|---|---|---|
| 2009/0276771 A1* | 11/2009 | Nickolov et al. | 717/177 |
| 2009/0300076 A1 | 12/2009 | Friedman et al. | |
| 2010/0058342 A1* | 3/2010 | Machida | 718/1 |
| 2010/0180275 A1 | 7/2010 | Neogi et al. | |
| 2010/0306767 A1* | 12/2010 | Dehaan | 718/1 |
| 2011/0055377 A1* | 3/2011 | Dehaan | 709/224 |
| 2011/0154329 A1 | 6/2011 | Arcese et al. | |
| 2011/0307885 A1* | 12/2011 | Cushion et al. | 718/1 |
| 2012/0066677 A1 | 3/2012 | Tang | |
| 2012/0109619 A1* | 5/2012 | Gmach | G06Q 10/067 703/21 |
| 2012/0174097 A1* | 7/2012 | Levin | 718/1 |
| 2013/0042003 A1* | 2/2013 | Franco et al. | 709/226 |
| 2014/0007097 A1* | 1/2014 | Chin et al. | 718/1 |

OTHER PUBLICATIONS

Van et al , "SLA-aware virtual resource management for cloud infrastructures," 9th IEEE International Conference on Computer and Information Technology (CIT'09), Xiamen: China (2009).
Grit et. al., Virtual Machine Hosting for Networked Clusters: Building the Foundations for "Autonomic" Orchestration. Second International Workshop on Virtualization Technology in Distributed Computing (VTDC 2006).
Verma et al., "pMapper: Power and Migration Cost Aware Application Placement," V. Issarny and R. Schantz (Eds): Middleware 2008, LNCS 5346, pp. 243-264, 2008.
International Standard ISO/IEC/IEEE 24765, 1st ed., 2010, "Systems and software engineering—Vocabulary," p. 397.
IEEE Computer Society, "Software and Systems Engineering Vocabulary," 2006, p. 298.
International Standard ISO/IEC 2382-1, 3rd ed., 1993, "Information technology—Vocabulary—Part 1: Fundamental terms," p. 12.
Barron's Dictionary of Computer and Internet Terms, 10th Ed., 2009, p. 514.
Microsoft Computer Dictionary, 5th Ed., 2003, p. 554.

* cited by examiner

DYNAMIC VIRTUAL MACHINE RESIZING IN A CLOUD COMPUTING INFRASTRUCTURE

FIELD OF THE INVENTION

The present invention relates generally to the electrical, electronic, and computer arts, and more particularly relates to cloud computing.

BACKGROUND

Cloud computing embraces a utility model that allows users to quickly provision computational resources with predictable costs. Elasticity is an important figure of merit for the cloud, measuring how quickly and to what degree, computational resources can be allocated. Elasticity in Infrastructure as a Service (IaaS) clouds translates into an ability to quickly provision (and de-provision) virtual machines (VMs).

Leveraging horizontal elasticity (i.e., scale-out) on an IaaS cloud is straightforward for applications designed to distribute and/or replicate computational capacity in a variable number of loosely coupled nodes. Quick addition and/or removal of new fixed-capacity VMs will often suffice to satisfy changes in demand. Such applications normally rely on scalable software infrastructures (e.g., MapReduce, BigTable, and Dynamo). These applications are sometimes referred to in the general sense as web applications.

However, there are additional application categories that cannot easily benefit from horizontal elasticity. For example, many enterprise applications normally increase service capacity by increasing computational resources on a small number of nodes (i.e., scale-up). Faced with the need to select a specific VM size at the time of deployment, consumers are often left with a dilemma. Specifically, while size selection is static, the resource demand imposed on the VM is almost certain to change over time, due to the varying load intensity from users. With fixed-size VMs, increases in demand may lead to resource exhaustion (and possibly service interruption), while decreases in demand lead to resource waste.

SUMMARY

Embodiments of the present invention advantageously enable dynamic virtual machine resizing for providing vertical scalability in a cloud infrastructure. Moreover, embodiments of the invention beneficially facilitate such dynamic virtual machine resizing without a need for an operating system (OS) reboot or application restart.

In accordance with an embodiment of the invention, a method for providing dynamic resizing of at least one virtual machine in a cloud infrastructure includes steps of: obtaining a measure of resource usage for the virtual machine and/or application performance of an application running on the virtual machine; determining, as a function of prescribed rules relating to resource usage and the measure of resource usage and/or application performance, whether the virtual machine requires resizing; and resizing the virtual machine to dynamically change resource availability for the virtual machine so as to maintain resource usage and/or application performance within prescribed limits defined by the prescribed rules.

These and other features and advantages of the present invention will become apparent from the following detailed description of illustrative embodiments thereof, which is to be read in connection with the accompanying drawings.

BRIEF DESCRIPTION OF THE DRAWINGS

The following drawings are presented by way of example only and without limitation, wherein like reference numerals (when used) indicate corresponding elements throughout the several views, and wherein.

It is to be appreciated that elements in the figures are illustrated for simplicity and clarity. Common but well-understood elements that may be useful or necessary in a commercially feasible embodiment may not be shown in order to facilitate a less hindered view of the illustrated embodiments.

DETAILED DESCRIPTION OF PREFERRED EMBODIMENTS

Aspects of the present invention will be described herein in the context of an illustrative mechanism to facilitate dynamic virtual machine resizing for providing vertical scalability in a cloud computing environment. It is to be appreciated, however, that the invention is not limited to the specific apparatus and/or methods illustratively shown and described herein. Nor is the invention necessarily limited to the types of applications that can derive a benefit from embodiments of the invention. Rather, embodiments of the invention are directed more broadly to techniques for providing vertical elasticity of virtual machines in a cloud infrastructure. Moreover, it will become apparent to those skilled in the art given the teachings herein that numerous modifications can be made to the embodiments shown that are within the scope of the present invention. That is, no limitations with respect to the specific embodiments described herein are intended or should be inferred.

Cloud providers have traditionally focused on supporting horizontally scalable applications, enabling on-demand access to resources through statically-sized virtual machines. However, not all cloud applications fit the horizontal (scale-out) model well, either because of important limitations in their design or due to legacy software deployments that are costly to overhaul, among other scenarios. Embodiments of the invention advantageously enable dynamic virtual machine resizing (through resource capping, resource hot plugging and/or resource eclipsing), for providing vertical scalability (i.e., scale-up) capabilities in cloud infrastructures. Moreover, embodiments of the invention beneficially facilitate such dynamic virtual machine resizing without a need for an operating system (OS) reboot or application restart.

Figure 1A:
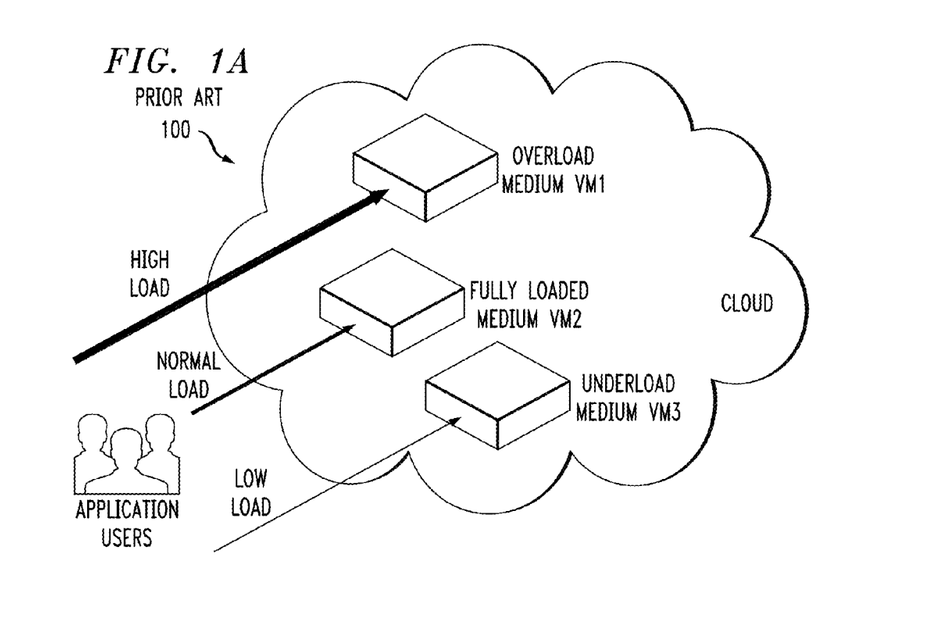
FIG. 1A conceptually depicts exemplary fixed-size virtual machines running a cloud-based application.

FIG. 1A conceptually illustrates exemplary standard fixed-size virtual machines in a cloud-based system 100. As apparent from FIG. 1A, a specific virtual machine size is conventionally selected at the time of application deployment, generally under a normal load assumption. While size selection is static, however, the resource demand imposed on the virtual machine typically changes over time, due at least in part to the varying load intensity from application users. With fixed-size virtual machines, increases in demand (high application load) may lead to resource exhaustion (i.e., overload), and possibly service interruption, while decreases in demand (low application load) may lead to resource waste (i.e., under-load).

Figure 1B:
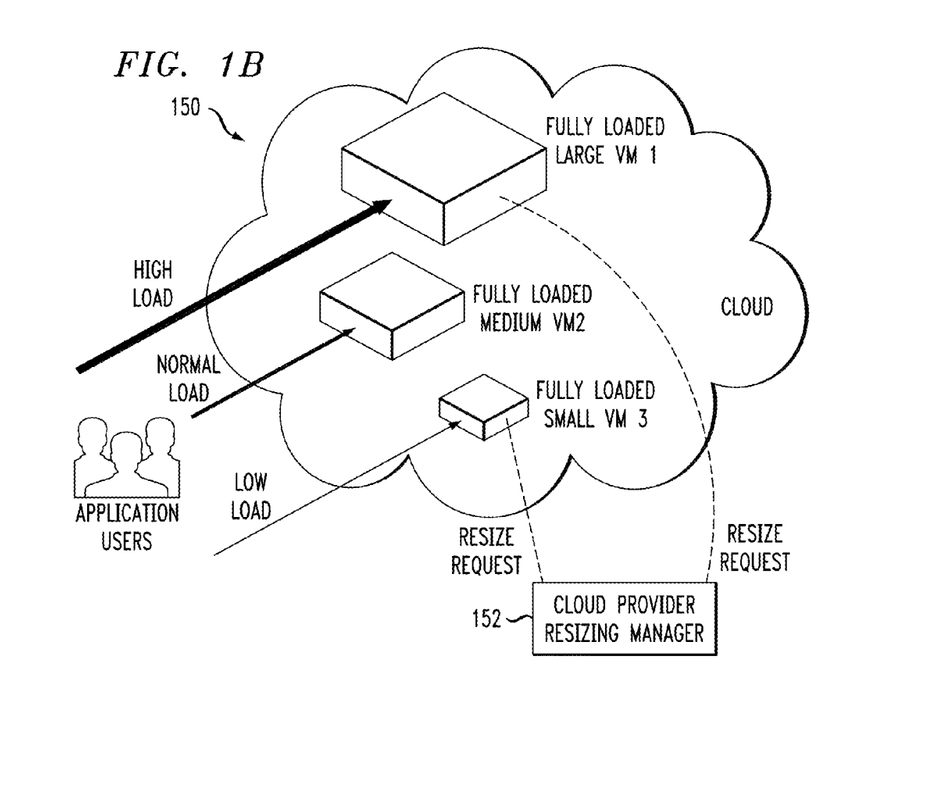
FIG. 1B conceptually depicts exemplary variable-sized virtual machines operative to alter their respective sizes in response to overload and/or under-load conditions, according to an embodiment of the invention.

FIG. 1B conceptually illustrates exemplary variable-sized virtual machines running in a cloud-based system 150, the virtual machines being operative to alter their respective sizes in response to varying load conditions, according to an embodiment of the invention. As apparent from FIG. 1B, a cloud provider resizing manager 152, or alternative control module, is included in the system 150. The resizing manager 152 is adapted to receive resizing requests from an application performance monitoring system or a cloud user and is operative to dynamically rescale the respective sizes of the virtual machines accordingly as a function of load intensity so that the virtual machines remain fully loaded regardless of varying load intensity from application users. For example, when load intensity is high (high load), the resizing manager 152 is operative to increase the size of the virtual machine (VM 1) so as to avoid an overload condition. Likewise, when load intensity is low (low load), the resizing manager 152 is operative to decrease the size of the virtual machine (VM 3) so as to avoid an under-load condition.

Vertical elasticity according to embodiments of the invention is often required in IaaS clouds. With this capability, virtual machines can be dynamically resized, as conceptually illustrated in FIG. 1B, through either the addition/removal of resource elements or the increase/decrease in the capacity of each resource element, all without reboot, application restart, or re-configuration/re-creation. For instance, according to an embodiment of the invention, virtual machines can increase in size either by addition of more processors or network adapters, or by respectively increasing (equivalent) frequency and bandwidth. Vertical elasticity can enable applications deployed in the cloud to manage both demand peaks and valleys by dynamically adjusting virtual machine resources at run-time. The cloud user can perform resizing: (i) directly, in an on-demand basis; or (ii) indirectly, by providing policies that a provider can enforce.

To illustrate the need for vertical elasticity in the cloud, classes of exemplary applications will be described that are already prepared to leverage this capability. As previously stated, embodiments of the invention are not limited to the specific applications described herein. Rather, other applications may also derive benefit from aspects of the invention, as will become apparent to those skilled in the art given the teachings herein.

One illustrative class of applications, namely, enterprise applications, is uniquely positioned to benefit from a cloud infrastructure. For example, corporations can derive benefits from migrating their applications to an IaaS cloud, including, but not limited to, a reduction in capital and operational costs, ubiquitous accessibility, and shared infrastructure. Additionally, high availability for these applications is often a strict requirement. Allowing the application to increase its capacity while avoiding downtime would be particularly valuable in this scenario. Providing cloud vertical elasticity in accordance with embodiments of the invention is an ideal strategy, since these applications have been traditionally designed for scaling up (vertically), and are oftentimes intrinsically unable to scale horizontally.

Decades of operational experience in the design and deployment of these applications on large symmetric multiprocessing (SMP) servers have led to components (e.g., business logic servers, databases, etc.) that are quite capable of using a variable amount of computing resources, provided that they are managed by a single operating system (OS). For example, applications like the DB2 database (commercially available from IBM Corporation) and newer versions of the Java virtual machine (JVM) incorporate autonomic characteristics and can react to changes in the amount of resources provided by the OS (e.g., changes in the number of processors and memory size). In these cases, each component of the enterprise application already possesses vertical elasticity capability, which can then be leveraged. In a sense, an application or administrator's virtual machine "resize" operation would be no less unusual than a "hot" hardware reconfiguration (e.g., adding new physical processors at runtime), a routine operation on large corporate servers.

Another illustrative class of applications, namely, desktop virtualization, has no native support for horizontal scaling and has been increasingly deployed in the cloud. A virtual desktop infrastructure (VDI) typically provides a stateless thin-client to the user while hosting the processing and storage resource in a remote virtual machine. In this environment, it is well known that desktops are characterized by long periods of inactivity (i.e., idleness), during which virtual machines can be down-sized to consume a minimal amount of resources required for the desktop. Similarly, a second example involves alleviating user wait times from bursty load by adding more resources to the virtual machine. Here, vertical elasticity may be useful for a number of workflows, such as code development, media processing, computer-aided design, etc.

Notwithstanding the clear and present need for vertical elasticity through virtual machine resizing, a conventional cloud infrastructure lacks a fundamental mechanism to enable dynamic virtual machine resizing. As previously mentioned, applications on both the server (application server and database) and the client (VDI) side of business processes have at least two primary characteristics that make the virtual machine resizing with reboot/reconfiguration (the only option, currently available) impractical: their optimal performance requires the presence of an appreciable amount of transient data (e.g., application caches) and their availability requirements are very stringent. In fact, it is not unusual to have a maximum allowed downtime of less than a day per year. Therefore, a virtual machine resizing operation should be as seamless and non-disruptive as a similar hardware operation on a large corporate server would be. Embodiments of the invention address this noted deficiency by presenting a dynamic virtual machine resizing mechanism, which will be described in further detail herein below.

One objective of virtual machine resizing is to give cloud-based applications more computing resources only when needed, allowing resources to be released at other times for use by other applications. Although a relatively simple concept in theory, this novel approach presents a departure from popular computing systems where resources are fixed (i.e., static) at boot time. With few exceptions, hypervisors, also known as virtual machine managers (VMMs), have been developed assuming that a fixed set of resources is available throughout the lifecycle of a virtual machine. Virtual machine instances that have variable (i.e., scalable) resources during run-time present two primary challenges: (1) providing a mechanism for the VMM to change the virtual hardware of the virtual machine at run-time; and (2) providing a mechanism for the OS and applications to adapt to changes in resources.

Selecting an appropriate virtual machine size, and adapting it at run-time, depends on various factors that include, but are not limited to, the cost of using resources and the impact on application performance. Once a virtual machine size is selected, changes in resources should be translated into performance increases that trickle up the software stack. According to embodiments of the invention, there are two primary types of possible changes to virtual machine resources: (1) capping (i.e., limiting) access to existing resources, which may be referred to herein as resource capping; and (2) adding or removing resources altogether, which may be referred to herein as hot plugging.

Resource capping changes the virtual machine's perceived capacity of the resource. It is typically implemented by time-sharing the physical resource, in accordance with an embodiment of the invention, but can also be implemented by reprogramming the resource, according to alternative embodiments. For example, by changing the perceived processor frequency or network interface bandwidth, the amount of usable resources given to the application will vary accordingly. Resource capping is available on many hypervisors (e.g., VMware®, a registered trademark of VMware, Inc., KVM (kernel-based virtual machine), and Xen) employed by cloud infrastructures. The hypervisor preferably leverages virtualization to implement resource capping in a manner that is completely transparent to the OS or application. Furthermore, changes in the resource limits can be highly dynamic, since they do not require application interruption, reboots or reconfigurations.

The second type of change, namely, hot plugging, affects the number of resources accessible by the virtual machine. By providing or removing access to entire processors, memory banks and/or network interfaces, the amount of usable resources given to an application can vary accordingly. Ideally, all elements in the software stack should support resource change: the hypervisor, the guest OS and application layers. By way of example only, the addition of a new physical processor core could be propagated to the virtual machine by having the hypervisor create a new virtual processor. This would then be initialized by the guest OS and subsequently used by the application to add more threads or processes.

Unfortunately, hot plugging is not uniformly supported at every layer of the software stack. While such support exists on select enterprise applications, most modern hypervisors are unable to perform such reconfigurations. For instance, while Linux can handle the addition or removal of devices, like processors, memory banks, and network cards, neither Xen nor KVM can add or remove resources on the running virtual machines.

To overcome a lack of uniform support for hot plugging, embodiments of the invention provide a simple yet effective mechanism that can achieve the desired non-disruptive virtual machine resize with modest changes to current cloud deployments: resource eclipsing. With this technique, according to embodiments of the invention, virtual machines are created with the largest number of resources, matching the maximum virtual machine size offered by the cloud provider. During boot, they are then configured to match a prescribed size, as may be selected by a user or cloud provider. Throughout a virtual machine's lifecycle, resources can be logically turned off or throttled.

With eclipsing, a resource (e.g., a virtual processor) is not removed from a virtual machine's configuration, but rather is made effectively invisible to applications running on the virtual machine. For instance, virtual machines running Linux can employ the kernel's hot plug support to logically remove processors and memory banks from the guest OS, and thus from the application's view. It is to be appreciated that although eclipsed virtual resources are not removed, the mapped physical resources are released to be used elsewhere (e.g., by other virtual machines).

By way of example only and without loss of generality, from an implementation standpoint, resource eclipsing can be implemented as a guest OS "resource balloon" driver. Unlike a memory balloon driver that attempts to reclaim unused or underutilized memory, an eclipse driver would manage guest OS access to all types of resources in the system. By altering the virtual machine size through eclipsing at the guest OS level, in accordance with embodiments of the invention, no support is needed in the hypervisor for hot plugging resources.

Figure 2:
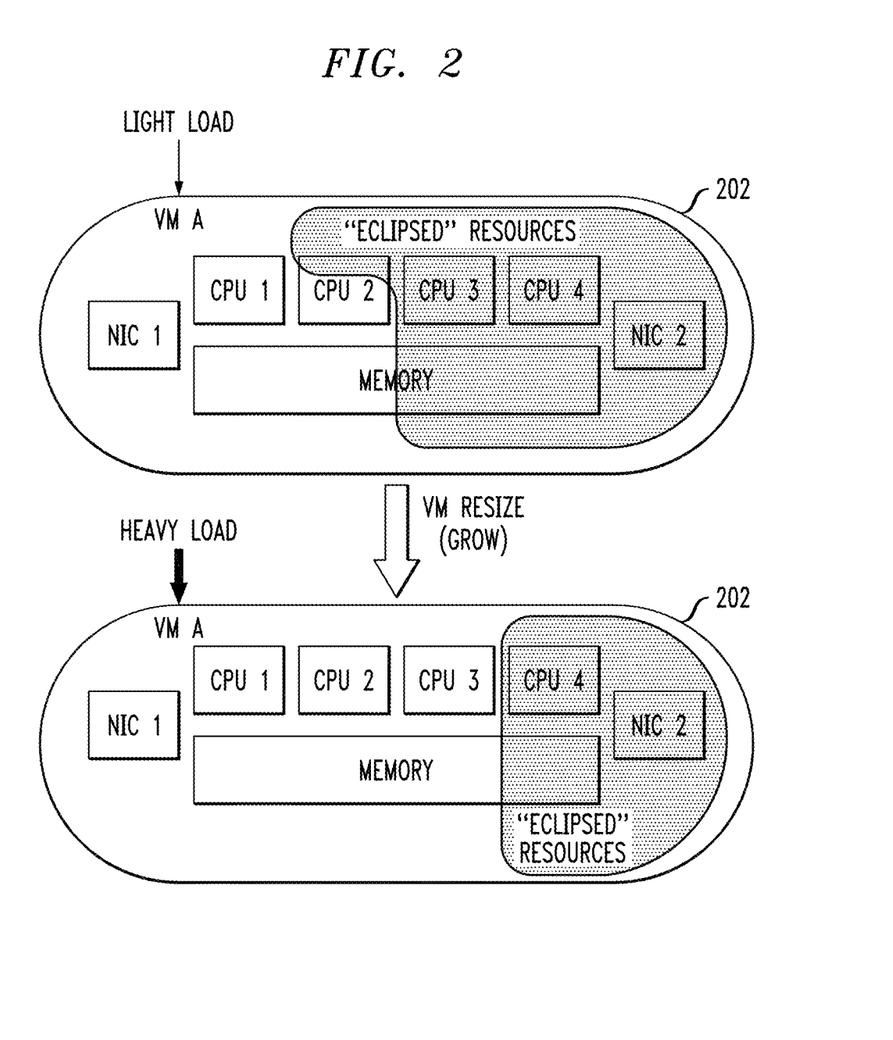
FIG. 2 conceptually depicts dynamic virtual machine resizing by resource capping and eclipsing, according to an embodiment of the invention.

FIG. 2 conceptually depicts dynamic virtual machine resizing by resource capping and resource eclipsing, according to embodiments of the invention. As apparent from FIG. 2, a virtual machine 202 is configured to include four virtual processors, CPU 1, CPU 2, CPU 3, and CPU 4, two virtual network interface controller (NICs), NIC 1 and NIC 2, and memory. In a first state, which in this embodiment is a light load state, two virtual processors, CPU 3 and CPU 4, are eclipsed and one virtual processor, CPU 2, is capped at about half of its maximum operating frequency. The memory is also capped at about half of its maximum storage capacity. Additionally, one of the virtual network interfaces, NIC 2, is eclipsed. The amount of resources needed by the virtual machine 202 at any given time may be determined by a resizing manager or alternative controller/monitor (not explicitly shown). As demand on the application increases, the virtual machine 202 enters a second state, which in this embodiment is a heavy load state, wherein an extra processor, CPU 3, is added (i.e., de-eclipsed), the capping on all processors, CPU 2 and NIC 2, is lifted, and capping of the memory is scaled back to about one-quarter, thereby increasing memory capacity.

While resource eclipsing gives the virtual machine owner flexibility in size, the enforcement of that size requires some caution. For example, special provisions should be taken to ensure that the user cannot tamper with the eclipsing mechanism to illegitimately obtain hidden resources.

Figure 3:
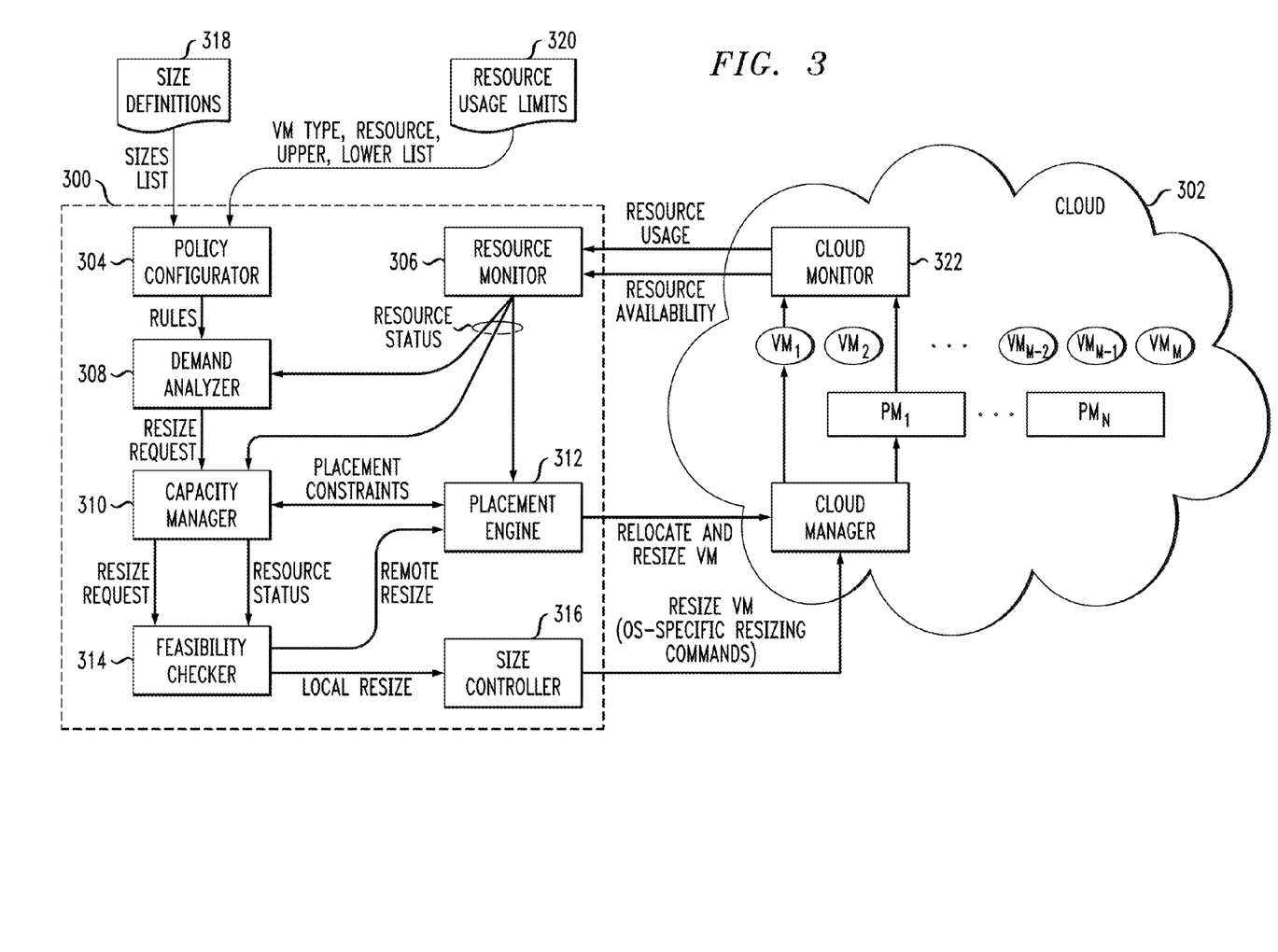
FIG. 3 is a block diagram depicting at least a portion of an exemplary dynamic virtual machine resizing module and its interaction with a cloud provider's infrastructure, according to an embodiment of the invention.

With reference now to FIG. 3, a block diagram depicts at least a portion of an exemplary dynamic virtual machine resizing module 300 and its interaction with a cloud provider's infrastructure, according to an embodiment of the invention. The virtual machine resizing module 300 is operative to continuously (or at least periodically) monitor resource usage of one or more virtual machines, $VM_1$, $VM_2$, ..., $VM_{M-2}$, $VM_{M-1}$, $VM_M$ running on a cloud 302, in addition to monitoring resource availability on such cloud, and, in accordance with a set of rules defining tolerable upper and lower limits on resource usage, the module 300 is operative to execute a reconfiguration of the number and/or capacity of resource elements assigned to each virtual machine without any need for interruption of the virtual machine's operation.

The virtual machine resizing module 300 is implemented, in this embodiment, as a closed loop system comprising seven sub-modules and four inputs. Specifically, resizing module 300 comprises a policy configurator 304, a resource monitor 306, a demand analyzer 308, a capacity manager 310, a placement engine 312, a feasibility checker 314 and a size controller 316. Although depicted as separate functional sub-modules or blocks, it is to be understood that one or more of the sub-modules may be combined either together or with one or more other sub-modules, and the functions of each of the combined sub-modules incorporated into the new module, as will be appreciated by those skilled in the art.

A first input to the resizing module 300 includes a list of virtual machine configurations, containing, for example, the number and capacity of resource elements assigned to a given virtual machine, defined by the cloud provider, each configuration being identified by a server size, instance type, virtual machine size, or other identifier. The size definitions may be determined prior to application deployment and stored, for example, in a size definitions table 318, or alternative storage element.

A second input to the resizing module 300 includes a list of acceptable upper and lower limits on resource usage, per resource type (e.g., processor, memory, storage, etc.), for each cloud user (arbitrarily) defined virtual machine "application" (e.g., "database" virtual machines, "web server" virtual machines, "high-priority application server" virtual machines, etc.). This list of upper and lower limits, virtual machine types, resources, etc., may be stored in a resource usage limits table 320, or alternative storage element.

A third input to the resizing module 300, which is provided by a cloud monitor 322 in the cloud 302, includes information regarding a per-resource type usage for each specific instance of the virtual machine "type" set defined by the cloud user. A fourth input to the resizing module 300, which is provided by the cloud monitor 322, includes information regarding resource availability on each physical machine (PM) that contains at least one of the aforementioned virtual machines.

In terms of functionality of the sub-modules in the virtual machine resizing module 300, the policy configurator 304 is operative to receive, parse and store the virtual machine size specifications supplied to the resizing module by the cloud provider (first input), and the per-virtual machine "application" and per-resource type, upper and lower limits for resource usage (second input). The resource monitor 306 is operative to continuously obtain data on both resource usage for the virtual machines (third input) and resource availability on the physical machines (fourth input), as may be measured by the cloud monitor 322. The demand analyzer 308 is operative to utilize the information generated by the policy configurator 304 (e.g., in the form of prescribed rules) and the resource monitor 306 and determine whether or not a monitored virtual machine needs to be increased in size (e.g., by increasing the number and/or capacity of the resource elements assigned to the monitored virtual machine) or decreased in size (e.g., by decreasing the number and/or capacity of the resource elements assigned to the monitored virtual machine).

The capacity manager 310 is operative to continuously, or at least periodically, obtain input data from the resource monitor 306 and demand analyzer 308 and to process notifications about resizing requests being attempted by the demand analyzer. The capacity manager 310 plans the overall capacity in such a way as to ensure that there will exist, with a prescribed target probability P, a feasible placement for the aggregated workload mix across all virtual machines in the cloud 302, and an alternative placement for the virtual machines that cannot be locally resized will be determined. The capacity manager 310 may utilize a prescribed algorithm to facilitate the resource planning process. The capacity manager 310 then forwards the resize request, along with resource status information, to the feasibility checker 314.

After receiving a resize request from the demand analyzer 308, forwarded by the capacity manager 310, the feasibility checker 314 determines if there are resources available on the physical machine to allow a virtual machine to be increased in size or, if the resources inside a virtual machine are available (i.e., empty), to allow the virtual machine to be decreased in size. In one embodiment, the feasibility checker 314 can be implemented as a separate component, as shown. In another embodiment, the functionality of the feasibility checker 314 can be integrated with that of the placement engine 312.

When the feasibility checker 314 finds that an in situ resize of a virtual machine is not possible (e.g., based on current available resource information), the feasibility checker passes this event to the placement engine 312 which is operative to make a decision on relocating a virtual machine from its current host to a different host (i.e., remote resize). In accordance with other embodiments, the feasibility checker 314 is operative to analyze historical resizing demand data (e.g., for a capacity planning subsystem) to plan physical capacity in such a way as to guarantee a target success probability of the resizing of the virtual machine.

Alternatively, when the feasibility checker 314 finds that an in situ resize of a virtual machine is possible, the event is passed to the size controller 316 (i.e., local resize) which is operative to establish appropriate communication channels to either the virtual machine or the physical machine to effectively carry out the resizing operation. The size controller 316 is preferably operative to confirm whether or not the virtual machine resizing operation was successful.

The size controller 316 is preferably dependent upon the capability of the virtual machine and OS to be able to add or remove resource elements and capacity without requiring recreation, reboot, operation interruption, or processing suspension. This capability may not necessarily be available for all hypervisors and/or OS types. Furthermore, different OS types may require different resizing methods. For instance, if the OS supports resource element removal/addition natively, as it is the case for IBM's AIX and Oracle's Solaris, the size controller 316 can simply issue OS-specific resizing commands to the virtual machine. Alternatively, if the OS does not support resource element removal/addition natively, as is the case for Linux and Microsoft Windows, resource eclipsing can be used, in accordance with embodiments of the invention.

As previously described, with resource eclipsing, a virtual machine is created with the largest possible size, and one or more resource elements are logically turned off from within the virtual machine and OS. Resource eclipsing does not remove the resource from the virtual machine. Rather, resource eclipsing in accordance with aspects of the invention is operative to hide (i.e., eclipse) resources at the guest OS level, so as to effectively make the eclipsed resource(s) unavailable to the virtual machine and available to other virtual machines requiring additional resource. Using this novel technique, the size controller 316 can issue "eclipsing" commands to the virtual machine.

An experimental illustration of a dynamic virtual machine resizing methodology according to an embodiment of the invention will now be described. A primary objective here is to show how a representative enterprise application benefits from vertical elasticity through dynamic virtual machine resizing in accordance with aspects of the invention, without any changes in the application.

The application chosen for this illustrative experiment is the DayTrader (DT) benchmark. DT simulates a two-tier (e.g., application server and database) online stock trading enterprise application. In order to generate application load, a lightweight workload simulator for web applications was used. The workload simulator mimics a variable number of clients issuing stock purchase and sell orders. A single DT instance, in this experiment, is composed of three VMs: one for load generation; one for the application server tier (WAS); and one for the database tier (DB2). In this experiment, only the WAS VM was configured to be resizable.

All VMs were housed on an eight-core (2 GHz) and 32 GB RAM host, having KVM on Red Hat® Enterprise Linux® (RHEL) 6.1 (registered trademarks of Red Hat, Inc.) as their hypervisor. The same RHEL 6.1 was used as a guest OS on each VM. For this experiment, processor capacity (frequency and number) was varied and it was discovered that processing was the bottleneck for the whole DT application, given the housing of the database files on a RAM disk. The novel resizing manager was built as a python client application. This module accesses both the resource capping mechanism in the hypervisor implemented through control groups, and the resource eclipsing mechanism in the guest VM's implemented through hot plugging.

The experiment was conducted as follows. Application load, in this illustration, is defined as the number of simultaneous connections used by random users (from a pool of 15,000) to issue random stock sell/purchase orders (from a pool of 40,000). In order to verify the ability of the application to benefit from VM resizing, the load level was progressively increased, from 1 to 40 (in select steps). Each load level was kept constant for four minutes. Application metrics, such as latency and throughput, and OS metrics, such as processor and memory usage, were monitored and recorded every five seconds.

Figure 4:
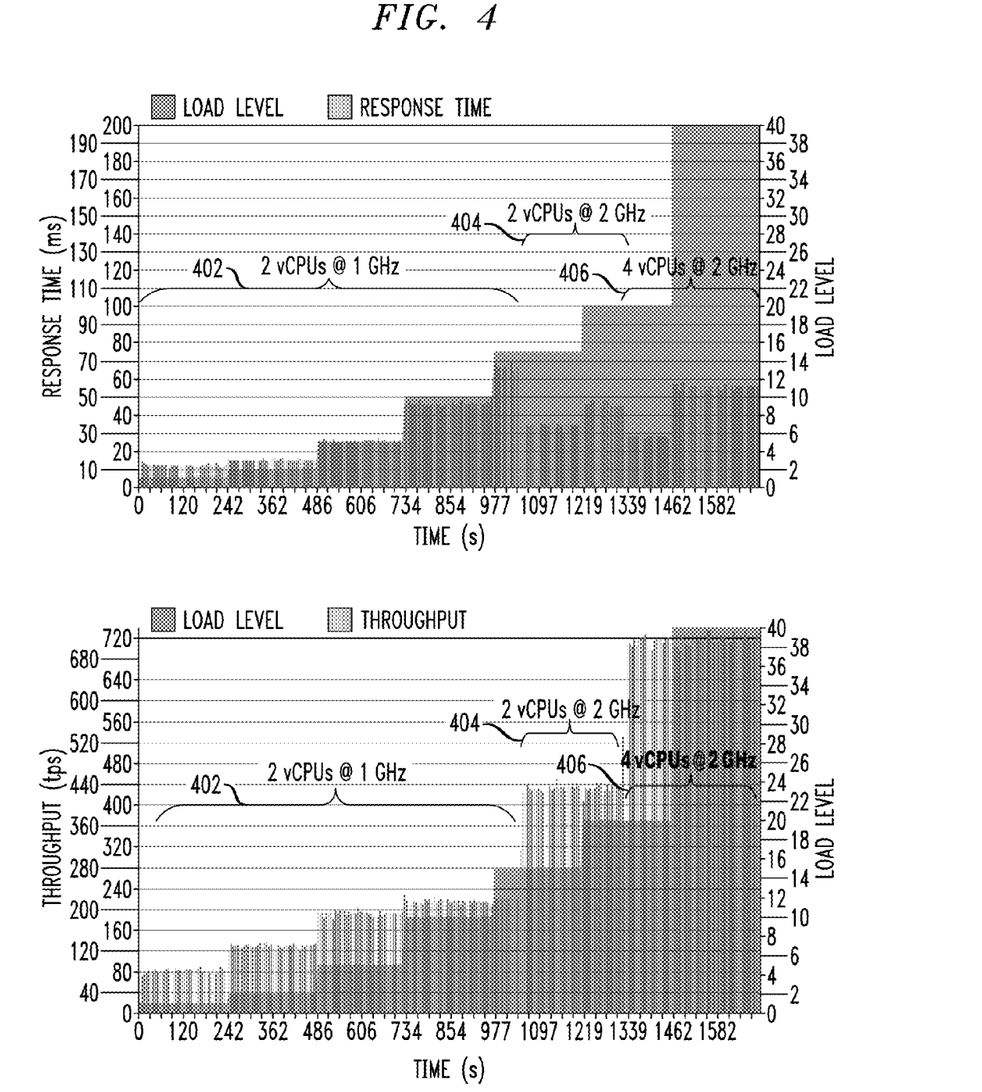
FIG. 4 are graphs depicting illustrative application performance improvements achieved using an exemplary dynamic virtual machine resizing methodology, according to an embodiment of the invention.

During this period, whenever a performance drop on the WAS VM was detected, a resize operation was executed. The operation was either to increase the processor frequency from 1 GHz to 2 GHz or the number of processors on the VM from one through four. Initially, the WAS VM is sized to have two processors (henceforth referred as virtual CPUs or vCPUs) running at 1 GHz. FIG. 4 are graphs showing the application performance, measured in terms of response time (in milliseconds) versus time (seconds) and throughput (in transactions per second (tps)) versus time throughout the entire experiment, as reported from the load generator VM, according to an embodiment of the invention.

The experiment is divided into three phases: namely, a first phase 402, a second phase 404 and a third phase 406. In the first phase 402, defined from the beginning of the experiment (t0 s) through about 17 minutes (t1043 s), identified in FIG. 4 as "2 vCPUs @ 1 GHz," the WAS VM is sized accordingly (each virtual CPU or vCPU is capped to access only up to about 50 percent of a 2 GHz physical CPU). The VM size is increased at the end of this phase 402 because an increase in load (from 10 simultaneous connections to 15) was not followed by a corresponding increase in throughput. This indicates that the application service capacity was exhausted, which was confirmed by the steep increase in response time.

After this growth of the VM size, the experiment enters the second phase 404, identified in FIG. 4 as "2 vCPUs @ 2 GHz." The throughput is the second phase 404 almost doubles (about 1.95×) and the response time is halved (about 0.52×), compared to the first phase 402, after a short resizing delay of less than about ten seconds. This performance improvement did not require any application restart or reconfiguration. This second phase 404 lasts from about 17 minutes (t1043 s) through about 21 minutes (t1315 s). At this point, using the same heuristics previously mentioned (i.e., transition from load 15 to load 20 without increase in throughput), the VM was resized to add more CPUs.

In the third phase 406, identified in FIG. 4 as "4 vCPUs @ 2 GHz," an increase in throughput (about 1.6×) and a decrease in response time (about 0.6×) is also immediately detected (e.g., within two consecutive samples). In this phase 406, load was increased once more (from 20 to 40 simultaneous connections), without the consequent increase in throughput. However, given the fact that the maximum VM size was already reached, the experiment was terminated at about 28 minutes (t1690 s) after its start. As previously stated, the inter-VM network and all other VMs were monitored throughout the experiment to ensure that no other bottleneck disturbed the measurements.

This experiment shows, among other things, that vertical elasticity through dynamic virtual machine resizing in accordance with embodiments of the invention can beneficially provide a non-disruptive mechanism for an enterprise application in the cloud to adapt to varying load conditions without over-provisioning.

Exemplary System and Article of Manufacture Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product, the computer program product in turn comprising a tangible computer readable storage medium storing in a non-transitory manner executable program instructions which, when executed, implement method steps according to an embodiment of the invention.

One or more embodiments of the invention, or elements thereof, can be implemented in the form of an apparatus including a memory and at least one processor that is coupled to the memory and operative to perform exemplary method steps.

Figure 5:
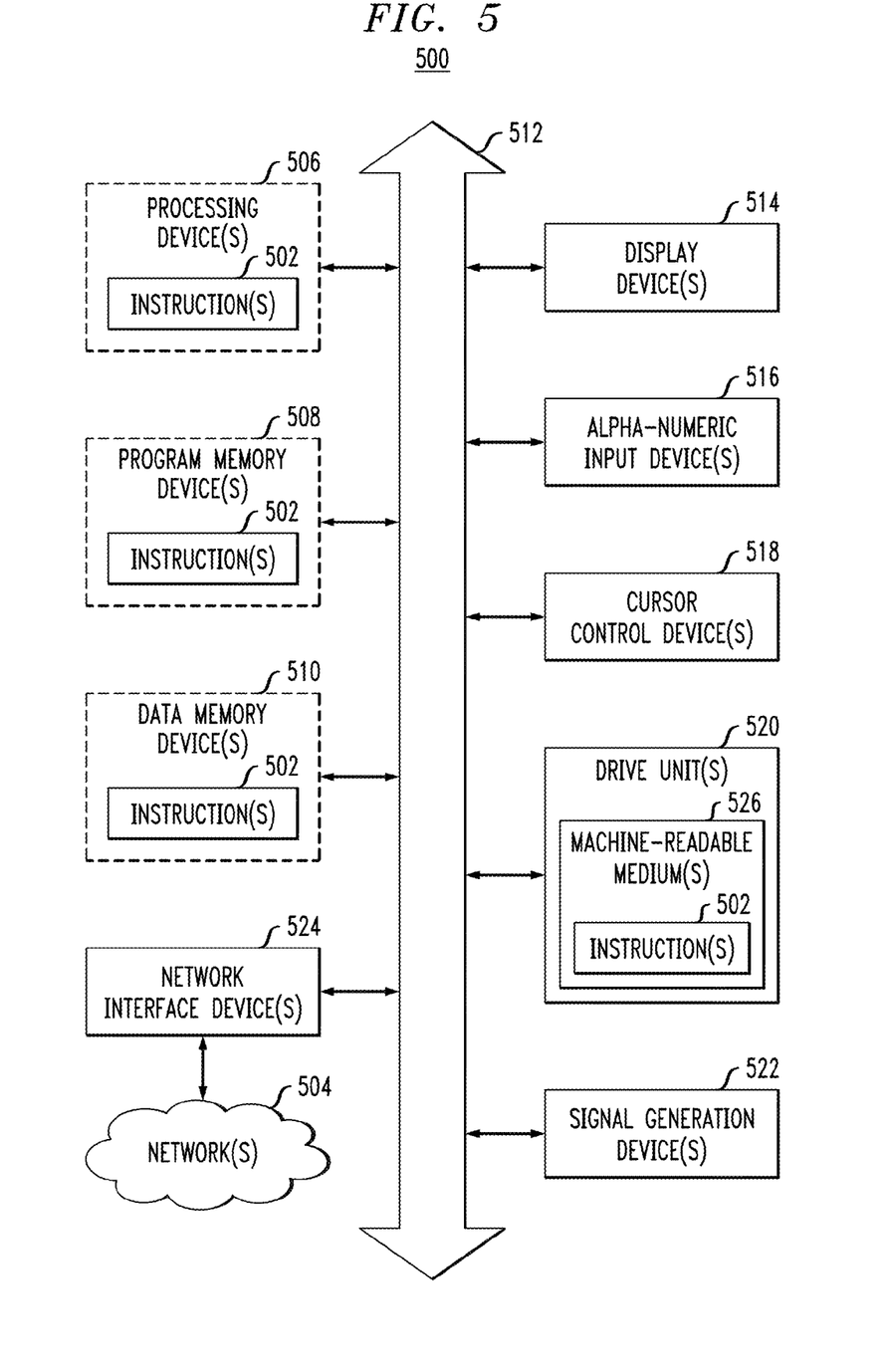
FIG. 5 is a block diagram depicting at least a portion of an exemplary machine in the form of a computing system configured to perform methods according to embodiments of the invention.

FIG. 5 is a block diagram of an embodiment of a machine in the form of a computing system 500, within which is a set of instructions 502 that, when executed, cause the machine to perform any one or more of the methodologies according to embodiments of the invention. In some embodiments, the machine operates as a standalone device. In some embodiments, the machine is connected (e.g., via a network 504) to other machines. In a networked implementation, the machine operates in the capacity of a server or a client-user machine in a server-client user network environment. Exemplary implementations of the machine as contemplated herein include, but are not limited to, a server computer, client-user computer, personal computer (PC), tablet PC, network server, personal digital assistant (PDA), mobile device, palmtop computer, laptop computer, desktop computer, communication device, personal trusted device, web appliance, or any machine capable of executing a set of instructions (sequential or otherwise) that specify actions to be taken by that machine.

The computing system 500 includes a processing device(s) 506 (e.g., a central processing unit (CPU), a graphics processing unit (GPU), or both), program memory device(s) 508, and data memory device(s) 510, which communicate with each other via a bus 512. The computing system 500 further includes display device(s) 514 (e.g., liquid crystal display (LCD), flat panel, solid state display, or cathode ray tube (CRT)). The computing system 500 includes input device(s) 516 (e.g., a keyboard), cursor control device(s) 518 (e.g., a mouse), disk drive unit(s) 520, signal generation device(s) 522 (e.g., a speaker or remote control), and network interface device(s) 524, operatively coupled together, and/or with other functional blocks, via bus 512.

The disk drive unit(s) 520 includes machine-readable medium(s) 526, on which is stored one or more sets of instructions 502 (e.g., software) embodying any one or more of the methodologies or functions herein, including those methods illustrated herein. The instructions 502 also reside, completely or at least partially, within the program memory device(s) 508, the data memory device(s) 510, and/or the processing device(s) 506 during execution thereof by the computing system 500. The program memory device(s) 508 and the processing device(s) 506 also constitute machine-readable media. Dedicated hardware implementations, such as but not limited to application specific integrated circuits, programmable logic arrays, and other hardware devices are configured to implement the methods described herein. Applications that include the apparatus and systems of various embodiments broadly comprise a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments, the methods, functions, or logic described herein are implemented as one or more software programs running on a computer processor. Dedicated hardware implementations including, but not limited to, application specific integrated circuits, programmable logic arrays and other hardware devices are configured to implement the methods described herein. Further, alternative software implementations including, but not limited to, distributed processing or component/object distributed processing, parallel processing, or virtual machine processing are configured to implement the methods, functions, or logic described herein.

The embodiment contemplates a machine-readable medium or computer-readable medium containing instructions 502, or that which receives and executes instructions 502 from a propagated signal so that a device connected to a network 504 can send or receive voice, video or data, and to communicate over the network 504 using the instructions 502. The instructions 502 are further transmitted or received over the network 504 via the network interface device(s) 524. The machine-readable medium also contains a data structure for storing data useful in providing a functional relationship between the data and a machine or computer in an illustrative embodiment of the systems and methods herein.

While the machine-readable medium 502 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform anyone or more of the methodologies of the embodiment. The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the embodiment is considered to include anyone or more of a tangible machine-readable medium or a tangible distribution medium, as listed herein and including art-recognized equivalents and successor media, in which the software implementations herein are stored.

It should also be noted that software, which implements the methods, functions or logic herein, are optionally stored on a tangible storage medium, such as: a magnetic medium, such as a disk or tape; a magneto-optical or optical medium, such as a disk; or a solid state medium, such as a memory card or other package that houses one or more read-only (non-volatile) memories, random access memories, or other re-writable (volatile) memories. A digital file attachment to e-mail or other self-contained information archive or set of archives is considered a distribution medium equivalent to a tangible storage medium. Accordingly, the disclosure is considered to include a tangible storage medium or distribution medium as listed herein and other equivalents and successor media, in which the software implementations herein are stored.

The illustrations of embodiments of the invention described herein are intended to provide a general understanding of the structure of the various embodiments, and they are not intended to serve as a complete description of all the elements and features of apparatus and systems that might make use of the structures described herein. Many other embodiments will become apparent to those of skill in the art upon reviewing the above description. Other embodiments are utilized and derived therefrom, such that structural and logical substitutions and changes are made without departing from the scope of this disclosure. Figures are also merely representational and are not necessarily drawn to scale. Certain proportions thereof may be exaggerated, while others diminished in order to facilitate an explanation of the embodiments of the invention. Accordingly, the specification and drawings are to be regarded in an illustrative rather than a restrictive sense.

Such embodiments of the inventive subject matter are referred to herein, individually and/or collectively, by the term "embodiment" merely for convenience and without intending to voluntarily limit the scope of this application to any single embodiment or inventive concept if more than one is in fact shown. Thus, although specific embodiments have been illustrated and described herein, it should be appreciated that any arrangement calculated to achieve the same purpose are substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single embodiment. Thus the following claims are hereby incorporated into the Detailed Description of Preferred Embodiments, with each claim standing on its own as a separate example embodiment.

The Abstract is provided to comply with 37 C.F.R. §1.72(b), which requires an abstract that will allow the reader to quickly ascertain the nature of the technical disclosure. It is submitted with the understanding that it will not be used to interpret or limit the scope or meaning of the claims. In addition, in the foregoing Detailed Description of Preferred Embodiments, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single embodiment. Thus the following claims are hereby incorporated into the Detailed Description of Preferred Embodiments, with each claim standing on its own as separately claimed subject matter.

Although specific example embodiments have been described, it will be evident that various modifications and changes are made to these embodiments without departing from the broader scope of the inventive subject matter described herein. Accordingly, the specification and drawings are to be regarded in an illustrative rather than a restrictive sense. The accompanying drawings that form a part hereof, show by way of illustration, and without limitation, specific embodiments in which the subject matter are practiced. The embodiments illustrated are described in sufficient detail to enable those skilled in the art to practice the teachings herein. Other embodiments are utilized and derived therefrom, such that structural and logical substitutions and changes are made without departing from the scope of this disclosure. This Detailed Description of Preferred Embodiments, therefore, is not to be taken in a limiting sense, and the scope of various embodiments is defined only by the appended claims, along with the full range of equivalents to which such claims are entitled.

Given the teachings of the invention provided herein, one of ordinary skill in the art will be able to contemplate other implementations and applications of the techniques of the invention. Although illustrative embodiments of the invention have been described herein with reference to the accompanying drawings, it is to be understood that the invention is not limited to those precise embodiments, and that various other changes and modifications are made therein by one skilled in the art without departing from the scope of the appended claims.

What is claimed is:

1. A method for providing dynamic resizing of at least one virtual machine in a cloud infrastructure, the method comprising steps of:

obtaining a measure of resource usage for the at least one virtual machine and application performance of an application running on the virtual machine, the at least one virtual machine having a set of one or more physical resource elements assigned thereto;

determining, as a function of prescribed rules relating to resource usage and the measure of resource usage for the at least one virtual machine and application performance, whether the at least one virtual machine requires resizing;

determining a feasibility of the resizing of the at least one virtual machine based at least in part on the information regarding resource availability; and resizing the at least one virtual machine to dynamically change resource availability for the at least one virtual machine so as to maintain resource usage and application performance within prescribed limits defined by the prescribed rules, said resizing being performed without any of: interrupting an application running on the at least one virtual machine, causing an operating system reboot, restarting the application, or causing a hardware reconfiguration;

wherein resizing the at least one virtual machine comprises periodically performing the steps of:

determining whether resource usage and application performance is below prescribed lower limits defined by the prescribed rules, and responsive to this determination hiding at least a portion of the set of one or more physical resource elements from the application such that the hidden portion of the set remains assigned to the at least one virtual machine but is effectively invisible to the application running on the virtual machine;

determining whether resource usage and application performance is still below prescribed lower limits defined by the prescribed rules and a pre-determined number of resources are hidden from the application in the hidden portion and responsive to this determination decreasing the size of the at least one virtual machine by decreasing at least one of a number and a capacity of one or more resource elements assigned to the at least one virtual machine;

determining whether the resource usage and application performance is above a higher limit defined by the prescribed rules and whether a resource exists in the hidden portion of physical resource elements and responsive to this determination making visible at least a portion of the set of one or more physical resource elements from the hidden portion for usage by the application; and determining whether the resource usage and application performance is above a higher limit defined by the prescribed rules and whether all resources in the hidden portion are visible and responsive to this determination increasing a size of the at least one virtual machine by at least one of adding one or more available resources to the at least one virtual machine.

2. The method of claim 1, further comprising:

obtaining information regarding resource availability on a physical machine which includes the at least one virtual machine; and determining a feasibility of the resizing of the at least one virtual machine based at least in part on the information regarding resource availability.

3. The method of claim 2, further comprising relocating the at least one virtual machine from a first host to a second host when the feasibility of the resizing determines that an in situ resize of the at least one virtual machine is not possible.

4. The method of claim 2, wherein the step of determining a feasibility of the resizing is based at least in part on current available resource information.

5. The method of claim 2, further comprising establishing at least one communication channel to at least one of the at least one virtual machine and the physical machine to perform the resizing when the feasibility of the resizing determines that an in situ resize of the at least one virtual machine is possible.

6. The method of claim 1, wherein the step of resizing is performed at least one of directly, in an on-demand basis, and indirectly, by providing prescribed policies to be enforced.

7. The method of claim 1, further comprising:
analyzing historical resize demand data; and
allocating physical capacity on at least one physical machine, based on said historical resizing demand data, in such a manner as to ensure a target success probability of the resizing of the at least one virtual machine.

8. The method of claim 1, wherein hiding at least a portion of the set comprises hiding at least one processor, assigned to the virtual machine, from the application.

9. The method of claim 1, wherein hiding at least a portion of the set comprises hiding at least one network interface, assigned to the virtual machine, from the application.

10. The method of claim 1, wherein
hiding at least a portion of the set comprises throttling at least a given one of the physical resource elements assigned to the virtual machine, thereby hiding a portion of the given physical resource element from the application, said throttling comprising restricting a maximum capacity perceived by the application for the given physical resource element.

11. The method of claim 10, wherein the given physical resource element comprises a processor, and wherein the perceived capacity comprises an operating frequency of the processor.

12. The method of claim 10, wherein the given physical resource element comprises a network interface, and wherein the perceived capacity comprises a bandwidth of the network interface.

13. The method of claim 1, further comprising creating the virtual machine by:
assigning the set of one or more physical resource elements to the virtual machine such that the actual size of the virtual machine is a maximum size of the virtual machine; and
hiding at least the portion of the set of one or more physical resource elements such that the perceived size of the virtual machine is less than the actual size of the virtual machine.

14. The method of claim 13, wherein hiding the portion of the set of one or more physical resource elements decreases the perceived size of the virtual machine without changing the actual size of the virtual machine; and making the hidden portion of the set visible increases the perceived size of the virtual machine without changing the actual size of the virtual machine.

15. An apparatus configured to dynamically resize at least one virtual machine instantiated on a computing system in a cloud infrastructure, the apparatus comprising:
a memory;
at least one processor operatively coupled with said memory; and a persistent storage device operatively coupled with said memory and storing in a non-transitory manner instructions which when loaded into said memory cause said at least one processor to implement at least one virtual machine resizing module adapted to communicate with the cloud infrastructure, the resizing module being configured to:
obtain a measure of resource usage for the at least one virtual machine and application performance of an application running on the virtual machine, the at least one virtual machine having a set of one or more physical resource elements assigned thereto;
determine, as a function of prescribed rules relating to resource usage and the measure of resource usage for the at least one virtual machine and application performance, whether the at least one virtual machine requires resizing;
determine a feasibility of the resizing of the at least one virtual machine based at least in part on the information regarding resource availability; and
resize the at least one virtual machine to dynamically change resource availability for the at least one virtual machine so as to maintain resource usage and application performance within prescribed limits defined by the prescribed rules, said resizing being performed without any of: interrupting an application running on the at least one virtual machine, causing an operating system reboot, restarting the application, or causing a hardware reconfiguration;
wherein resizing the at least one virtual machine comprises periodically performing the steps of:
determining whether resource usage and application performance is below prescribed lower limits defined by the prescribed rules, and responsive to this determination hiding at least a portion of the set of one or more physical resource elements from the application such that the hidden portion of the set remains assigned to the at least one virtual machine but is effectively invisible to the application running on the virtual machine;
determining whether resource usage and application performance is still below prescribed lower limits defined by the prescribed rules and a pre-determined number of resources are hidden from the application in the hidden portion and responsive to this determination decreasing the size of the at least one virtual machine by decreasing at least one of a number and a capacity of one or more resource elements assigned to the at least one virtual machine;
determining whether the resource usage and application performance is above a higher limit defined by the prescribed rules and whether a resource exists in the hidden portion of physical resource elements and responsive to this determination making visible at least a portion of the set of one or more physical resource elements from the hidden portion for usage by the application; and
determining whether the resource usage and application performance is above a higher limit defined by the prescribed rules and whether all resources in the hidden portion are visible and responsive to this determination increasing a size of the at least one virtual machine by at least one of adding one or more available resources to the at least one virtual machine.

16. The apparatus of claim 15, wherein the at least one virtual machine resizing module is further operative: to obtain information regarding resource availability on a physical machine which includes the at least one virtual machine; and to determine a feasibility of the resizing of the at least one virtual machine based at least in part on the information regarding resource availability.

17. The apparatus of claim 16, wherein the at least one virtual machine resizing module is further operative to establish at least one communication channel to at least one of the at least one virtual machine and the physical machine to perform the resizing when the feasibility of the resizing determines that an in situ resize of the at least one virtual machine is possible.

18. A virtual machine resizing module configured to dynamically resize at least one virtual machine instantiated on a computing system in a cloud infrastructure, the resizing module comprising:
    a memory;
    at least one processor operatively coupled with said memory; and
    a persistent storage device operatively coupled with said memory and storing in a non-transitory manner instructions which when loaded into said memory cause said at least one processor to implement:
    a policy configurator operative to receive, parse and store virtual machine size specifications supplied to the resizing module and to generate prescribed rules as a function of the virtual machine size specifications;
    a resource monitor operative to obtain data regarding resource usage for the at least one virtual machine and resource availability on at least one physical machine associated with the cloud infrastructure, the at least one virtual machine having a set of one or more physical resource elements assigned thereto;
    a demand analyzer operative to utilize the prescribed rules generated by the policy configurator and the data obtained by the resource monitor, and to determine therefrom whether a monitored virtual machine requires a change in size;
    a capacity manager operative to receive the data obtained by the resource monitor and information from the demand analyzer regarding whether the monitored virtual machine requires a change in size, and to process one or more notifications relating to at least one resizing request generated by the demand analyzer;
    a feasibility checker operative to determine, as a function of the at least one resizing request, whether there are any resources available on the physical machine to allow the monitored virtual machine to be increased in size, or, when resources associated with the monitored virtual machine are available, to allow the monitored virtual machine to be decreased in size; and
    a size controller operative to establish a communication channel to one of the monitored virtual machine and the physical machine to resize the monitored virtual machine in accordance with information generated by the feasibility checker and the at least one resizing request, said size controller being configured to resize the monitored virtual machine without any of: interrupting an application running on the at least one virtual machine, causing an operating system reboot, restarting the application, or causing a hardware reconfiguration;
    wherein resizing the at least one virtual machine comprises periodically performing the steps of:
        determining whether resource usage and application performance is below prescribed lower limits defined by the prescribed rules, and responsive to this determination hiding at least a portion of the set of one or more physical resource elements from the application such that the hidden portion of the set remains assigned to the at least one virtual machine but is effectively invisible to the application running on the virtual machine;
        determining whether resource usage and application performance is still below prescribed lower limits defined by the prescribed rules and a pre-determined number of resources are hidden from the application in the hidden portion and responsive to this determination decreasing the size of the at least one virtual machine by decreasing at least one of a number and a capacity of one or more resource elements assigned to the at least one virtual machine;
        determining whether the resource usage and application performance is above a higher limit defined by the prescribed rules and whether a resource exists in the hidden portion of physical resource elements and responsive to this determination making visible at least a portion of the set of one or more physical resource elements from the hidden portion for usage by the application; and
        determining whether the resource usage and application performance is above a higher limit defined by the prescribed rules and whether all resources in the hidden portion are visible and responsive to this determination increasing a size of the at least one virtual machine by at least one of adding one or more available resources to the at least one virtual machine.

19. The virtual machine resizing module of claim 18, wherein the feasibility checker is further configured:
    to analyze historical resizing demand data; and
    to allocate physical capacity on said at least one physical machine, based on said historical resizing demand data, to ensure a target success probability of the resizing of the monitored virtual machine.

20. A non-transitory computer-readable storage medium storing instructions that, when executed by a processing system, perform a method for dynamically resizing at least one virtual machine instantiated on a computing system in a cloud infrastructure, the method comprising:
    obtaining a measure of resource usage for the at least one virtual machine and application performance of an application running on the virtual machine, the at least one virtual machine having a set of one or more physical resource elements assigned thereto;
    determining, as a function of prescribed rules relating to resource usage and the measure of resource usage for the at least one virtual machine and application performance, whether the at least one virtual machine requires resizing; and
    resizing the at least one virtual machine to dynamically change resource availability for the at least one virtual machine so as to maintain resource usage and application performance within prescribed limits defined by the prescribed rules, said resizing being performed without any of: interrupting an application running on the at least one virtual machine, causing an operating system reboot, restarting the application, or causing a hardware reconfiguration;
    wherein resizing the at least one virtual machine comprises periodically performing the steps of:
        determining whether resource usage and application performance is below prescribed lower limits defined by the prescribed rules, and responsive to this determination hiding at least a portion of the set of one or more physical resource elements from the application such that the hidden portion of the set remains assigned to the at least one virtual machine but is effectively invisible to the application running on the virtual machine;

determining whether resource usage and application performance is still below prescribed lower limits defined by the prescribed rules and a pre-determined number of resources are hidden from the application in the hidden portion and responsive to this determination decreasing the size of the at least one virtual machine by decreasing at least one of a number and a capacity of one or more resource elements assigned to the at least one virtual machine;

determining whether the resource usage and application performance is above a higher limit defined by the prescribed rules and whether a resource exists in the hidden portion of physical resource elements and responsive to this determination making visible at least a portion of the set of one or more physical resource elements from the hidden portion for usage by the application; and determining whether the resource usage and application performance is above a higher limit defined by the prescribed rules and whether all resources in the hidden portion are visible and responsive to this determination increasing a size of the at least one virtual machine by at least one of adding one or more available resources to the at least one virtual machine.

\* \* \* \* \*